Jan. 20, 1959
G. D. HALL
2,869,752
LOCKING DEVICE FOR CLOSURES
Filed Nov. 16, 1956
2 Sheets-Sheet 2
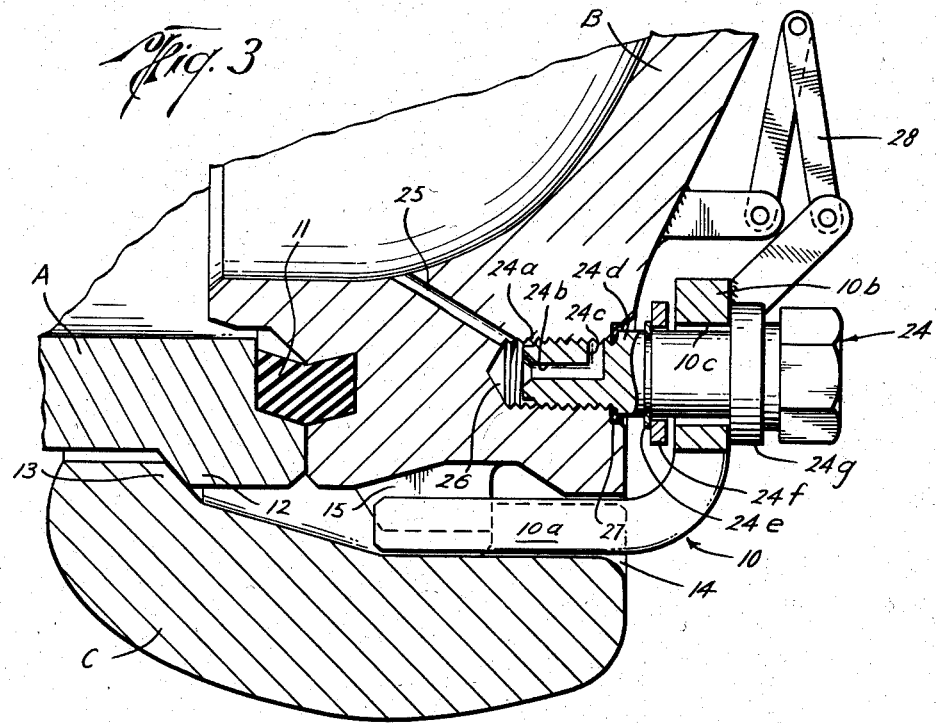
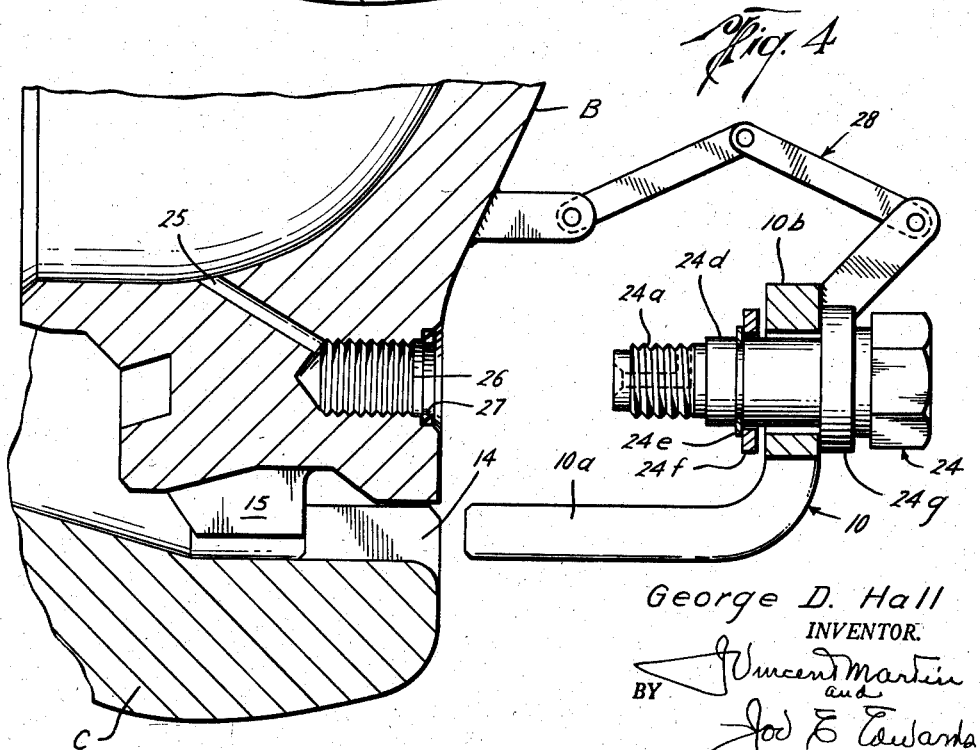
George D. Hall
INVENTOR.
BY Vincent Martin
and
Jod E. Edwards
ATTORNEYS United States Patent Office 2,869,752
Patented Jan. 20, 1959

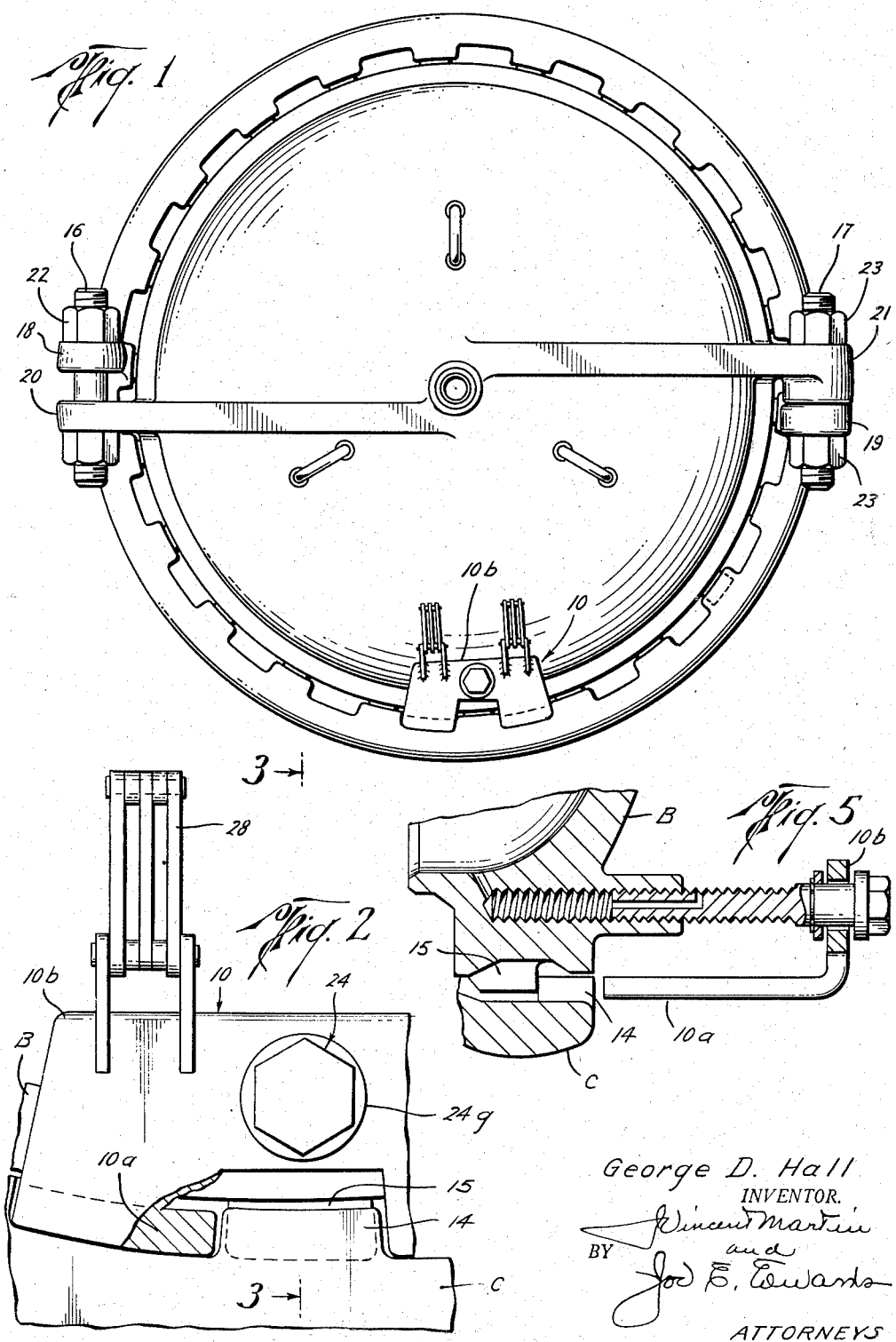

2,869,752

LOCKING DEVICE FOR CLOSURES

George D. Hall, Houston, Tex., assignor to Thornhill-Craver Co., Inc., Houston, Tex., a corporation of Texas Application November 16, 1956, Serial No. 622,673

3 Claims. (Cl. 220—40)

This invention relates to locking devices for closures for pressure vessels.

There is an inherent danger involved in the removal of any type of removable cover from a pressure vessel because if the pressure has not been released prior to such removal, the cover may be suddenly released with great force with possible injuries and damage resulting. If the cover to be removed is of the usual flange type with a multiplicity of bolts, it is probable that as the bolts are loosened a condition will be obtained where the flange is sufficiently loose so that the fluid tight seal will be broken to allow the release of pressure before the bolts are removed enough to allow the cover to be blown off. This is not always the case, however, even with this type of closure.

There are, of course, closures of many various designs. One such closure, which differs from the conventional flange type, employs in essence an interrupted thread arrangement for retaining the cover or plug in which the plug is retained by mating helical projections on the outside of the plug and on the inside of the retaining ring. The parts of such a closure are assembled by rotation of the retaining ring through a very small arc and by tightening one or two bolts placed through suitable lugs on the face of the retaining ring and the periphery of the blanking plug. Once tightened and subjected to pressure, this type of closure is friction locking so that the friction of the mating surfaces of the helical projections will be sufficient to prevent the retaining ring being backed off to release the plug. The usual procedure has formerly been to remove the bolts and strike the retaining ring with sufficient impact to release the friction lock to allow the retaining ring to be turned to release the plug. It is evident that this sudden release of the engaged parts, if substantial pressure obtains in the vessel, will result in the blanking plug being ejected from the vessel with great force. This danger has been recognized and attempts have been made to off-set this possibility by only loosening the bolts, then breaking the friction seal on the helical projections allowing the bolts to limit the rotation of the retaining member so that the parts cannot become fully disengaged. While this procedure will sometimes allow the pressure to escape around the gasket which seals the parts, many such closures are fitted with pressure energized gaskets which will not allow the pressure to escape until the parts are totally disengaged and in these cases the above method will not prevent the parts being blown apart.

Accordingly it is an object of this invention to provide means preventing the removal of the cover or blanking plug from such pressure vessel until the pressure obtaining in such vessel has been fully released.

Another object of this invention is to provide positive locking action against removal of the blanking plug so that such positive locking action is releasable only after actuation of pressure releasing means.

Another object of this invention is to provide a safety device which will operate to release the pressure obtaining in a vessel even though the operator neglects to bleed off the pressure prior to attempting to remove the plug.

Still another object of this invention is to provide unitary means, carried by the closure, for locking the parts of a friction locking closure and for releasing the pressure retained by such closure prior to disengagement of such locking action.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

Figure 1 is a front elevation of a friction locking closure showing a locking device, constructed in accordance with the invention, operably associated therewith.

Figure 2 is an enlarged front elevation of the locking device, as shown in Figure 1, shown with parts of the closure omitted and parts broken away for purposes of illustration.

Figure 3 is an enlarged transverse sectional view, taken on the line 3—3 in Figure 2, showing the parts in locking position, Figure 4 is an enlarged transverse sectional view, similar to Figure 3, showing the parts of the locking device in released position, and Figure 5 is a sectional detail of a modified form of the invention.

Referring more particularly to the drawings, the numeral 10 broadly designates the locking device. The locking device 10 is shown associated with a friction locking closure which includes a hub member A of a pressure vessel and a blanking plug or cover B which is retained in a fluid tight sealing engagement with the hub A by the retaining ring C.

A pressure energized gasket 11 is provided to facilitate the fluid tight seal between the annular hub A and the substantially cylindrical plug B. The annular retaining ring C is held in engagement with the hub A by engagement of the shoulder or flange 12 carried by the hub and the internal shoulder 13 carried by the retaining ring C.

Referring now, especially, to Figures 3 and 4, it is noted that the inner surface of the retaining ring C is provided with a plurality of spaced helical projections 14 adjacent its outer edge and that the blanking plug B is provided with spaced helical projections 15 extending radially from its periphery so that when the hub A and the blanking plug B are held in locking engagement, the outer surfaces of the helical projections 15 will be engaged in mating relationship with the inner surfaces of the projections 14. The blanking plug B is thus retained by mating helical projections 15 engaging similar helical projections 14 on the inside of the retaining ring C thus forming essentially an interrupted thread arrangement.

Figure 1 shows a pair of bolts 16 and 17 passing through lugs 18 and 19 suitably carried by the retaining ring C and lugs 20 and 21 carried by the blanking plug B. The bolts 16 and 17 are provided with nuts 22 and 23, respectively, and it is evident that by tightening these nuts 22 and 23 that the bolts 16 and 17 will impart a turning action to the blanking plug B and the retaining ring C, which will cause engagement of the mating projections 14 and 15 when turned through a relatively small arc. Thus, once the parts are tightened and subjected to pressure from the vessel, the closure is friction locking so that the friction of the mating surfaces of the helical projections 14 and 15 tend to prevent the retaining ring C from being backed off to release the blanking plug B.

The gasket 11 is constructed of flexible material and is pressure actuated to insure a fluid tight joint.

As illustrated, the locking device 10 includes a member which is formed with a pair of inwardly extending locking legs or projections 10a located at each lower side of the member. The main portion 10b of the member is in the form of a plate or second leg portion and is preferably made integral with the locking legs. The plate portion 10b is disposed at substantially a right angle to the plane of projection of the locking legs 10a and overlies the face of the blanking plug B. It is noted that although two locking legs are illustrated, the purpose of the invention may be accomplished by a single locking leg or by a plurality of such legs.

Pressure releasing means in the form of a bleeder plug designated at 24 extends through the plate or second leg portion 10b and is threadably secured within the blanking plug B as at 24a. A passageway 25 is provided in the blanking plug B so that the interior of the pressure vessel may communicate with the tapped hole 26 into which the bleeder plug 24 is threadably secured. A passageway 24b is provided within the bleeder plug 24 communicating with the tapped hole 26 and extends almost to the end of the threaded portion 24a where it joins a passage 24c at right angles thereto from the edge of the threaded portion 24a.

A gasket 27 and a shoulder 24d of the bleeder plug 24 serve as a fluid tight seal for the bleeder plug when fully engaged. A conventional split ring 24e confines a metallic washer 24f, which serves as a flange, which together with the flange 24g confine the bleeder plug 24 for rotation within the hole 10c in the second leg 10b of the locking member 10. If desired, the metallic washer 24f may be welded to the bleeder plug 24 in lieu of the split ring 24e. The entire locking assembly 10 carrying the bleeder plug 24 is movably attached to the blanking plug B by suitable linkage 28 which has suitable connection with the blanking plug B and the locking device 10.

In operation, therefore, when removing the blanking plug B from the closure assembly, it is necessary to remove the legs 10a from the spaces between the mating projections 14 and 15. Before the removal of the locking device, however, it is necessary to remove the bleeder plug 24 from the blanking plug B. In accomplishing the removal of the bleeder plug it is necessary to unscrew the bleeder plug exposing the passageway 24c communicating through the passageways 24b and 25 with the interior of the pressure vessel so that the presence of pressure within the vessel may be immediately detected by the operator; the device thus functions as a safety means which warns the operator of the presence of internal pressure so that he may conduct himself accordingly in the subsequent removal of the closure. When the pressure within the pressure vessel has been bled down to a safe pressure, the bleeder plug may be fully removed from the tapped hole 26 carrying with it the locking device 10.

This locking device is always conveniently positioned on the blanking plug by means of the linkage 28 which is shown extended in Figure 4 where the entire locking assembly has been fully disengaged. The linkage is, in effect, a hinge or connection and the invention is not to be limited to the particular construction illustrated since any means which will connect the assembly to the closure will serve the purpose.

It is especially noted that the legs 10a provide an extraordinarily positive locking action since these would have to be sheared off if the closure were to be opened without their removal and since the bleeder plug confines the locking device within these projections, it is necessary to retract the bleeder plug to provide an indication of the presence of pressure within the vessel prior to removal of the blanking plug B.

The foregoing disclosure and description of the invention is illustrative and explanatory thereof and various changes in the size, shape and materials, as well as in the details of the illustrated construction, may be made within the scope of the appended claims without departing from the spirit of the invention.

In Figure 5, a modification of the structure is shown wherein the hinge connection is completely omitted. In this form, a bleeder plug 124, which is of greater length than plug 24, is engaged with an elongated threaded opening 126. The length of the opening and of the plug is such as compared to the length of the locking legs 10a, that said legs will be moved to a fully disengaged position before the plug is completely unthreaded from the opening. Thus the threads of the bleeder plug function as the connection to the closure.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a closure for a vessel having a hub, a blanking plug, a retaining ring positioned over and secured to said hub, a plurality of radial spaced projections carried by the periphery of said plug, a plurality of spaced projections carried within said retaining ring mating with said projections carried by said plug to retain said blanking plug and forming a fluid tight closure, a locking device including, an element having a first leg portion inserted between mating projections and a second leg portion projecting inwardly of the periphery of said blanking plug, a bleeder plug threadably positioned within said blanking plug, a passageway within said bleeder plug communicating with the interior of the vessel and which when the bleeder plug is at least partially retracted from the blanking plug allows pressure to be exhausted from the vessel, and means rotatably mounting said bleeder plug within said second leg portion so that the blanking plug may be removed only after such partial retraction of the bleeder plug.

2. A locking device as set forth in claim 1, together with a hinged linkage means connecting said blanking plug and the second leg portion of said locking device, whereby the locking device is attached to the plug.

3. In a closure for a vessel having a hub, a blanking plug, a retaining ring positioned over and secured to said hub, a plurality of radial spaced projections carried by the periphery of said plug, a plurality of spaced projections carried within said retaining ring mating with said projections carried by said plug to retain said blanking plug and forming a fluid tight closure, a locking device including, an element having a first leg portion inserted between mating projections and a second leg portion projecting inwardly of the periphery of said blanking plug, a bleeder plug threadably positioned within said blanking plug, a passageway within said bleeder plug communicating with the interior of the vessel and which when the bleeder plug is at least partially retracted from the blanking plug allows pressure to be exhausted from the vessel, and shoulder means on said bleeder plug overlying said second leg portion and retaining said first leg portion between said mating projections until the bleeder plug is at least partially retracted from the blanking plug so that the blanking plug may be removed only after such partial retraction of the bleeder plug.

References Cited in the file of this patent

UNITED STATES PATENTS

| 1,663,755 | Gammeter | Mar. 27, 1928 |
| 2,614,724 | Wyman | Oct. 21, 1952 |

FOREIGN PATENTS

| 302,787 | Great Britain | Dec. 27, 1928 |
| 874,691 | France | May 18, 1942 |
| 565,307 | Great Britain | Nov. 6, 1944 |
| 828,335 | Germany | Jan. 17, 1952 |